(12) United States Patent
Bridenbaugh et al.

(10) Patent No.: US 12,085,950 B2
(45) Date of Patent: *Sep. 10, 2024

(54) VISUAL OVERLAYS FOR PROVIDING PERCEPTION OF DEPTH

(71) Applicant: Caterpillar Inc., Peoria, IL (US)

(72) Inventors: Michael William Bridenbaugh, Pittsburgh, PA (US); Craig Allan Lehocky, Pittsburgh, PA (US); Jeffrey J. Baker, Pittsburgh, PA (US); Jeffrey Kent Berry, Yorkville, IL (US); Brad Robert Van De Veer, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,391

(22) Filed: Sep. 27, 2023

(65) Prior Publication Data
US 2024/0028042 A1    Jan. 25, 2024

Related U.S. Application Data

(63) Continuation of application No. 17/248,527, filed on Jan. 28, 2021, now Pat. No. 11,860,641.

(51) Int. Cl.
*G05D 1/00*     (2024.01)
*B60R 21/013*   (2006.01)
*G06T 17/05*    (2011.01)

(52) U.S. Cl.
CPC ......... *G05D 1/0246* (2013.01); *B60R 21/013* (2013.01); *G05D 1/027* (2013.01); *G06T 17/05* (2013.01)

(58) Field of Classification Search
CPC .... G05D 1/0246; G05D 1/027; G05D 1/0038; B60R 21/013; G06T 17/05; G06T 7/593; G06T 7/70; G06T 2207/10016; G06T 2207/10028; H04L 67/025
USPC .......................................................... 382/104
See application file for complete search history.

(56) References Cited

U.S. PATENT DOCUMENTS

| | | | |
|---|---|---|---|
| 5,155,683 A * | 10/1992 | Rahim | G05D 1/0038 |
| | | | 701/28 |
| 6,363,632 B1 * | 4/2002 | Stentz | E02F 9/24 |
| | | | 701/50 |
| 9,047,688 B2 * | 6/2015 | Lynch | G06T 15/205 |
| 9,322,148 B2 | 4/2016 | Stratton | |
| 9,727,055 B2 | 8/2017 | Matthews | |

(Continued)

FOREIGN PATENT DOCUMENTS

| | | | | |
|---|---|---|---|---|
| CN | 114761996 A | * | 7/2022 | ............... G06N 3/04 |
| CN | 114945952 A | * | 8/2022 | ........... G05D 1/0219 |

(Continued)

*Primary Examiner* — Mahendra R Patel

(57) ABSTRACT

A device may determine, based on image data of an environment that includes a ground surface, depth information indicating distances from a vehicle to different areas of the ground surface. The device may generate, based on the depth information, an overlay to indicate a range of distances from the vehicle. The range of distances may be associated with an area. The device may provide, for display, a video feed including the image data with the overlay on the ground surface. The overlay may provide the perception of depth, with respect to the area, during an operation of the vehicle.

18 Claims, 8 Drawing Sheets

(56) References Cited

U.S. PATENT DOCUMENTS

| | | | | |
|---|---|---|---|---|
| 9,938,688 | B2* | 4/2018 | Fletcher | E02F 3/434 |
| 10,399,325 | B2* | 9/2019 | Friend | E02F 9/261 |
| 10,407,872 | B2* | 9/2019 | Wei | E02F 3/7604 |
| 11,048,277 | B1 | 6/2021 | Zhu | |
| 11,236,492 | B1* | 2/2022 | Ready-Campbell | E02F 9/267 |
| 2013/0278631 | A1* | 10/2013 | Border | G06F 3/04842 |
| | | | | 345/633 |
| 2014/0247352 | A1* | 9/2014 | Rathi | G06V 20/58 |
| | | | | 348/148 |
| 2018/0005407 | A1* | 1/2018 | Browning | G05D 1/024 |
| 2019/0019303 | A1* | 1/2019 | Siver | G01S 17/08 |
| 2019/0129430 | A1* | 5/2019 | Madsen | B60K 35/00 |
| 2019/0141310 | A1* | 5/2019 | Pohl | H04N 13/122 |
| 2020/0218288 | A1 | 7/2020 | Johnson | |
| 2021/0040706 | A1* | 2/2021 | Ready-Campbell | G01N 33/24 |
| 2021/0043085 | A1* | 2/2021 | Kreiling | E02F 3/96 |
| 2021/0096726 | A1* | 4/2021 | Faulkner | G06F 3/013 |
| 2021/0158561 | A1* | 5/2021 | Park | G06T 7/74 |
| 2021/0339753 | A1* | 11/2021 | Cherney | B60W 40/076 |
| 2022/0024485 | A1* | 1/2022 | Theverapperuma | G06V 10/77 |

FOREIGN PATENT DOCUMENTS

| | | | | | |
|---|---|---|---|---|---|
| EP | 3926107 | A1 * | 12/2021 | | E02F 9/205 |
| EP | 4050164 | A1 * | 8/2022 | | E02F 9/205 |
| JP | 2003239328 | A * | 8/2003 | | |
| JP | 6938389 | B2 * | 9/2021 | | B64C 39/024 |
| TW | 201727514 | A * | 8/2017 | | G06F 16/248 |
| WO | WO-2017059490 | A1 * | 4/2017 | | G01B 11/24 |
| WO | WO-2019189260 | A1 * | 10/2019 | | E02F 3/435 |
| WO | WO-2020069049 | A1 * | 4/2020 | | G06N 3/0454 |
| WO | WO-2020196896 | A1 * | 10/2020 | | E02F 3/437 |

* cited by examiner

VISUAL OVERLAYS FOR PROVIDING PERCEPTION OF DEPTH

CROSS-REFERENCE TO RELATED APPLICATIONS

This Patent Application is a continuation of and claims the benefit of priority to U.S. Nonprovisional patent application Ser. No. 17/248,527, filed on Jan. 28, 2021, the content of which is incorporated herein by reference in its entirety.

TECHNICAL FIELD

The present disclosure relates generally to remote control operation of a machine and, for example, to remote control operation of a machine based on visual overlays providing the perception of depth.

BACKGROUND

A remote control operator may operate construction equipment without line-of-sight with respect to the construction equipment. In some instances (e.g., with respect to controlling a construction equipment such as a dozer or an excavator), the remote control operator may desire to have a good understanding of a terrain surrounding the construction equipment in order to control the construction equipment to perform a task in an efficient manner. In order to efficiently control the construction equipment (without line-of-sight with respect to the construction equipment), the remote control operator may rely on a video feed from a camera system on-board the construction equipment.

Typical camera systems (for remote control operations without line-of-sight) provide two dimensional (2D) images. The 2D images do not provide sufficient information (e.g., enough detail) to enable the remote control operator to gain a good understanding of the terrain surrounding the construction equipment. Typical camera systems are subject to limitations that prevent such camera systems from providing sufficient information to enable a good understanding of the terrain. The limitations may include limitations with respect to available network bandwidth associated with providing the video feed, limitations with respect to a frame rate associated with the 2D images, limitations with respect to latency associated with providing the video feed, limitations with respect to an inherent lack of information regarding depth in 2D images, limitations with respect to distortion of an image caused by a wide angle lens of such camera systems, and limitations with respect to the situational and/or spatial relationship between the remote machine and the terrain.

The lack of sufficient information to enable a good understanding of the terrain and/or the lack of information regarding depth may cause the construction equipment to operate inefficiently (e.g., inefficient use of components such as an engine, an implement, among other examples), may cause damage to the construction equipment (e.g., due to unascertained conditions of the terrain), may cause a task to be performed incorrectly by the construction equipment, among other examples. Therefore, relying on typical camera systems to operate the construction equipment (without line-of-sight with respect to the construction equipment) may waste computing resources, network resources, and other resources associated with inefficient operation of the construction equipment, associated with repairing the construction equipment, associated with remedying a task that was performed incorrectly by the construction equipment, among other examples.

Japanese Patent Application No. JP2003239328 (the '328 publication) discloses a measuring device of an earthwork construction surface capable of easily seizing a quantity of required sediment at ground leveling work by precisely measuring construction accuracy of a ground leveling surface in real time. The '328 publication discloses that the measuring device has Global Positioning System (GPS) antennas for detecting a position and a longitudinal directional inclination of heavy machinery, a roller inclination sensor for detecting a roller attitude of the heavy machinery, and an on-vehicle control part for inputting a signal from the GPS antennas and the roller inclination sensor.

While the '328 publication discloses measuring construction accuracy of a ground leveling surface in real time, the '328 publication does not disclose that the measuring device provides information to enable a good understanding of a terrain surrounding the heavy machinery and/or information regarding depth of the terrain for remote control operation of the heavy machinery.

The visual overlays of the present disclosure solve one or more of the problems set forth above and/or other problems in the art.

SUMMARY

In some implementations, a construction vehicle includes a stereo camera configured to obtain three-dimensional image data of an environment that includes a ground surface on which the construction vehicle is located; and a controller configured to: determine, based on the three-dimensional image data, depth information indicating distances from the construction vehicle to different areas of the ground surface; generate, based on the depth information, an overlay associated with a depth range, the overlay being generated to indicate a range of distances from the construction vehicle; and provide the overlay, for display, with a video feed associated with the three-dimensional image data.

In some implementations, a method performed by a device includes determining, based on image data of an environment that includes a ground surface, depth information indicating distances from a vehicle to different areas of the ground surface; generating, based on the depth information, an overlay to indicate a range of distances from the vehicle, the range of distances being associated with an area of the ground surface; and providing, for display, a video feed including the image data with the overlay on the ground surface, the overlay providing the perception of depth, with respect to the area, during an operation of the vehicle.

In some implementations, a work vehicle includes a stereo camera that provides image data of an environment that includes a ground surface on which the work vehicle is located; a bucket; and a controller configured to: determine a first position of the bucket with respect to the work vehicle, the bucket being raised above the ground surface; determine, based on the first position, an estimated first ground engagement location, on the ground surface, at which the bucket is to engage the ground surface when the bucket is lowered to the ground surface; generate an overlay based on a first distance, on the ground surface, from the work vehicle to the estimated first ground engagement location; provide the overlay for display with a video feed associated with the image data, the overlay being provided on the ground surface and indicating a distance, in a plane parallel to the ground surface, from the work vehicle to the bucket; detect a movement of the bucket from the first position to a second position; determine, based on the second position, an estimated second ground engagement location, on the ground surface, at which the bucket is to engage the ground surface when the bucket is lowered to the ground surface; and adjust the overlay, provided for display, based on a second distance from the work vehicle to the estimated second ground engagement location, the overlay, after adjusting the overlay, indicating a change in the distance from the work vehicle to the bucket based on the movement of the bucket.

DETAILED DESCRIPTION

This disclosure relates to overlays (e.g., bands) that are provided with a video feed (e.g., in real time or near real time) of an environment that includes a ground surface on which a machine is located. The overlays may appear to lay over the ground surface in the video feed. The overlays may provide an indication of depth with respect to different areas of the ground surface and/or provide an indication of one or more other characteristics of the different areas of the ground surface, such as elevation. In other words, the overlays may augment the video feed into a combined, streaming image to provide an understanding of a terrain surrounding the machine during a remote control operation of the machine (without line-of-sight with respect to the machine).

The term "machine" may refer to a machine that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
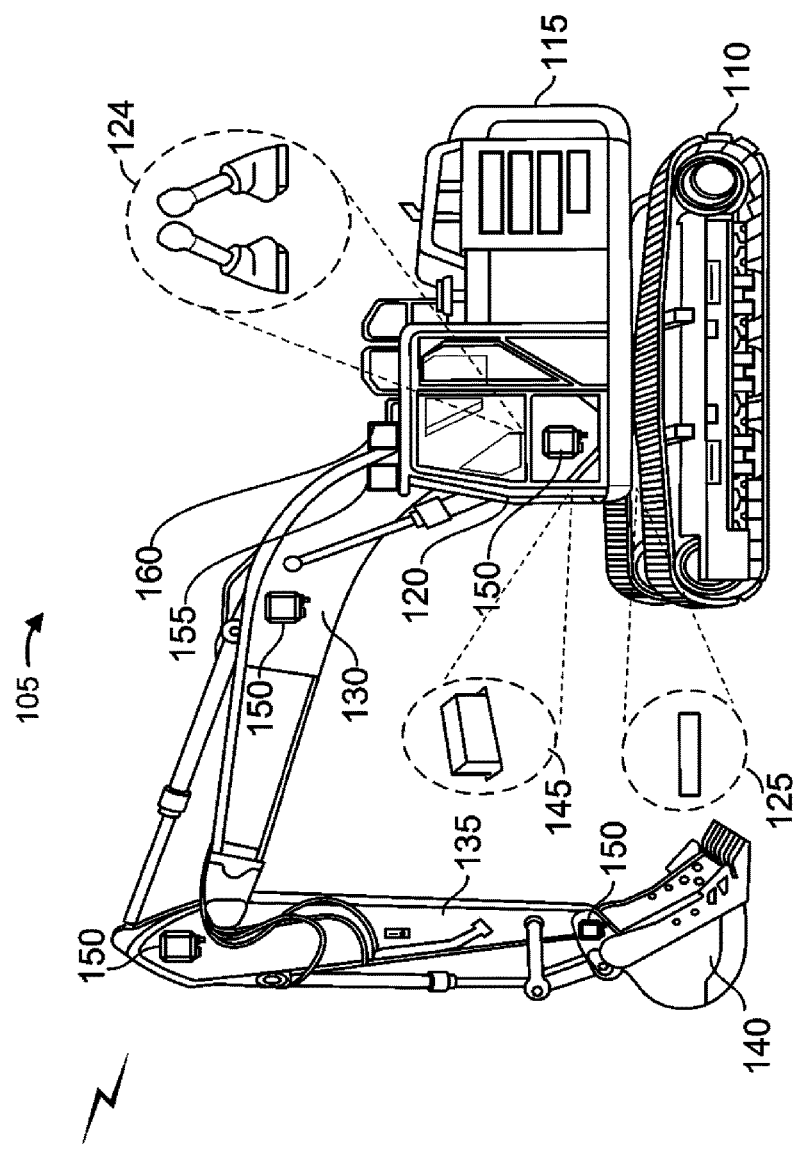
FIG. 1 is a diagram of an example implementation described herein.
Figure 1:
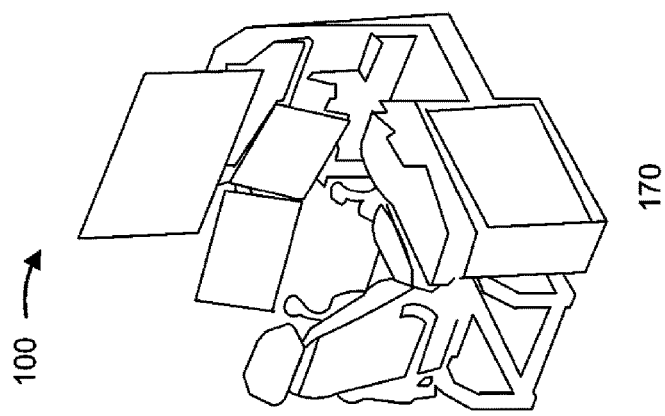

FIG. 1 is a diagram of an example implementation 100 described herein. As shown in FIG. 1, the example implementation 100 includes a machine 105. Machine 105 is embodied as an earth moving machine, such as an excavator. Alternatively, the machine 105 may be another type of machine, such as a dozer.

As shown in FIG. 1, machine 105 includes ground engaging members 110, a machine body 115, an operator cabin 120, and a swivel element 125. Ground engaging members 110 may include tracks (as shown in FIG. 1), wheels, rollers, and/or the like, for propelling machine 105. Ground engaging members 110 are mounted on machine body 115 and are driven by one or more engines and drive trains (not shown). Machine body 115 is mounted on a rotating frame (not shown). Operator cabin 120 is supported by machine body 115 and the rotating frame. Operator cabin 120 includes an integrated display (not shown) and operator controls 124, such as, for example, integrated joystick. Operator controls 124 may include one or more input components.

For an autonomous machine, operator controls 124 may not be designed for use by an operator and, rather, may be designed to operate independently from an operator. In this case, for example, operator controls 124 may include one or more input components that provide an input signal for use by another component without any operator input. Swivel element 125 may include one or more components that enable the rotating frame (and machine body 115) to rotate (or swivel). For example, swivel element 125 may enable the rotating frame (and machine body 115) to rotate (or swivel) with respect to ground engaging members 110.

As shown in FIG. 1, machine 105 includes a boom 130, a stick 135, and a machine work tool 140. Boom 130 is pivotally mounted at a proximal end of machine body 115, and is articulated relative to machine body 115 by one or more fluid actuation cylinders (e.g., hydraulic or pneumatic cylinders), electric motors, and/or other electro-mechanical components. Stick 135 is pivotally mounted at a distal end of boom 130 and is articulated relative to boom 130 by the one or more fluid actuation cylinders, electric motors, and/or other electro-mechanical components. Machine work tool 140 is mounted at a distal end of stick 135 and may be articulated relative to stick 135 by the one or more fluid actuation cylinders, electric motors, and/or other electro-mechanical components. Machine work tool 140 may be a bucket (as shown in FIG. 1) or another type of tool that may be mounted on stick 135.

As shown in FIG. 1, machine 105 includes a controller 145 (e.g., an electronic control module (ECM)), one or more inertial measurement units (IMUs) 150 (referred to herein individually as "IMU 150," and collectively referred to as "IMUs 150"), one or more monocular cameras 155 (referred to herein individually as "monocular camera 155," and collectively referred to as "monocular cameras 155"), and a stereo camera 160. Controller 145 may control and/or monitor operations of machine 105. For example, controller 145 may control and/or monitor the operations of machine 105 based on signals from operator controls 124, signals from IMUs 150, signals from one or more monocular cameras 155, signals from stereo camera 160, and/or signals from remote control device 170.

As shown in FIG. 1, IMUs 150 are installed at different positions on components or portions of machine 105, such as, for example, on machine body 115, boom 130, stick 135, and machine work tool 140. An IMU 150 includes one or more devices that are capable of receiving, generating, storing, processing, and/or providing signals indicating a position and orientation of a component, of machine 105, on which the IMU 150 is installed. For example, IMU 150 may include one or more accelerometers and/or one or more gyroscopes. The one or more accelerometers and/or the one or more gyroscopes generate and provide signals that can be used to determine a position and orientation of the IMU 150 relative to a frame of reference and, accordingly, a position and orientation of the component. While the example discussed herein refers to IMUs 150, the present disclosure is applicable to using one or more other types of sensor devices that may be used to determine a position and orientation of a component of machine 105.

Monocular camera 155 may include one or more devices that are capable of obtaining and providing image data (e.g., two-dimensional (2D) image data) of an environment that includes a ground surface on which the machine 105 is located. The image data may be included in a video feed of the environment. Stereo camera 160 may include two or more devices that are capable of obtaining and providing image data (e.g., three-dimensional (3D) image data) of the environment. For example, the image data (of stereo camera 160) may provide depth information indicating distances from machine 105 to different areas of the ground surface. The image data (of stereo camera 160) may be included in a video feed of the environment. While the example discussed herein refers to stereo camera 160, the present disclosure is applicable to using one or more other types of devices that may provide the depth information (e.g., that are capable of capturing an array of depth measurements), such as a light detection and ranging (LIDAR) device or other sensor devices capable of capturing an array of depth measurements.

FIG. 1 shows a single monocular camera 155 and a single stereo camera 160 as being included with machine 105. In practice, machine 105 may include one or more additional monocular cameras 155 and/or one or more additional stereo cameras 160.

As further shown in FIG. 1, the example implementation 100 includes a remote control device 170. Remote control device 170 may include one or more devices that are configured to be used for a remote control operation of machine 105 (e.g., a remote control operation without line-of-sight with respect to machine 105). For example, remote control device 170 may include one or more displays, one or more operator controls (similar to operator controls 124), one or more controllers (similar to controller 145), among other examples.

Remote control device 170 may display, via the one or more displays, the video feed (including the image data of one or more monocular cameras 155) and/or the video feed (including the image data of stereo camera 160). In some examples, remote control device 170 may include one or more input components (e.g., a keyboard, a microphone, joysticks, buttons, pedals, among other examples) that are used to provide input regarding the video feed (including the image data of one or more monocular cameras 155) and/or the video feed (including the image data of stereo camera 160).

As indicated above, FIG. 1 is provided as an example. Other examples may differ from what was described in connection with FIG. 1.

Figure 2:
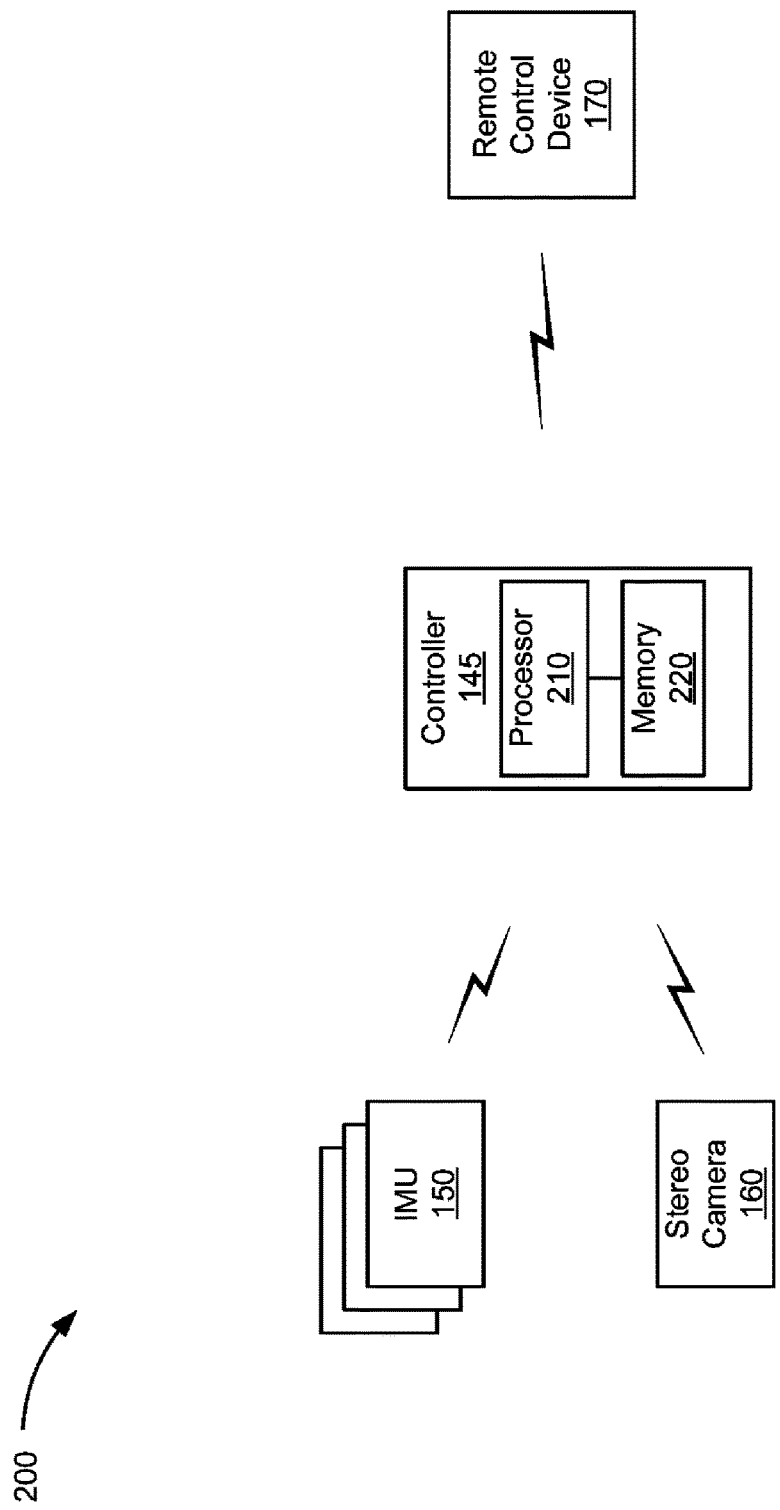
FIG. 2 is a diagram of an example system described herein.

FIG. 2 is a diagram of an example system 200 described herein. As shown in FIG. 2, system 200 includes controller 145, IMUs 150, stereo camera 160, and remote control device 170. In some examples, controller 145 may be included in machine 105. Alternatively, controller 145 may be included in remote control device 170. Alternatively, controller 145 may be included in a device different than the remote control device 170 (hereinafter referred to as "controller associated device"). For instance, controller 145 may be part of a back office system.

Controller 145 may include one or more processors 210 (referred to herein individually as "processor 210," and collectively as "processors 210"), and one or more memories 220 (referred to herein individually as "memory 220," and collectively as "memories 220"). A processor 210 is implemented in hardware, firmware, and/or a combination of hardware and software. Processor 210 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. A processor 210 may be capable of being programmed to perform a function.

Memory 220 includes a random-access memory (RAM), a read only memory (ROM), and/or another type of dynamic or static storage device (e.g., a flash memory, a magnetic memory, and/or an optical memory) that stores information and/or instructions for use by a processor 210 to perform a function. For example, when performing the function, controller 145 may obtain data from stereo camera 160 (e.g., image data). Controller 145 may generate overlays based on depth (e.g., determined using the data) and/or based on a position and orientation of machine 105. In some examples, the overlays may include semitransparent bands. The semitransparent bands may be horizontal bands with respect to a traveling direction of machine 105. Controller 145 may provide, to remote control device 170, a video feed including the data and the overlays to facilitate a remote control operation of machine 105. Additionally, or alternatively, controller 145 may generate overlays based on a position and orientation of machine work tool 140.

IMUs 150 may include one or more first IMUs 150 and one or more second IMUs 150. The one or more first IMUs 150 may sense a position and orientation of machine work tool 140 and may generate tool position data that indicates the position and orientation of machine work tool 140. The one or more first IMUs may be located on machine work tool 140 and/or located on boom 130 and/or stick 135. The one or more second IMUs 150 may sense a position and orientation of machine body 115 and may generate machine position data that indicates the position and orientation of machine body 115. The machine position data may be used to determine whether machine 105 is located on a sloped surface. The one or more second IMUs may be located on machine body 115.

IMUs 150 may provide the tool position data and/or the machine position data to controller 145 periodically (e.g., every thirty seconds, every minute, every five minutes, among other examples). Additionally, or alternatively, IMUs 150 may provide the tool position data and/or the machine position data to controller 145 based on a triggering event (e.g., a request from controller 145, a request from remote control device 170, detecting a movement of machine work tool 140, detecting a movement of machine body 115, among other examples).

Stereo camera 160 may obtain data of an environment that includes a terrain surrounding machine 105 and includes a ground surface on which machine 105 is located. As an example, stereo camera 160 may obtain image data of the environment (e.g., images of the environment). In some instances, the image data may include 3D image data of the environment. Stereo camera 160 may provide the data to controller 145 periodically (e.g., every one hundredth second, every one thousandth second, among other examples). Additionally, or alternatively, stereo camera 160 may provide the data to controller 145 based on a triggering event (e.g., a request from controller 145).

Remote control device 170 may receive the video feed with the overlays from controller 145 and display the video feed on a display of remote control device 170. The overlays may provide the perception of depth (with respect to different areas of the ground surface) and/or provide an indication of a ground engagement location of machine work tool 140 during a remote control operation of machine 105 using remote control device 170 and/or an indication of a height of the terrain (e.g., a height of the ground surface). The ground engagement location may indicate a location at which machine work tool 140 is to engage the ground surface when machine work tool 140 is lowered to the ground surface from its current above-the-ground position.

The overlays, included in the video feed, may facilitate a remote control operation of machine 105 by remote control device 170. Remote control device 170 may provide (e.g., using the one or more input components) visual characteristics information identifying visual characteristics of the overlays. Remote control device 170 may provide the visual characteristics information to controller 145 to cause controller 145 to adjust the visual characteristics of the overlays, as explained in more detail below.

In some implementations, stereo camera 160 may provide the data to controller 145 in a manner similar to the manner described above. For example, assume that stereo camera 160 has received a request from controller 145 for the data. Stereo camera 160 may provide the data to controller 145 based on receiving the request. Controller 145 may receive the data from stereo camera 160 and process the data. In some examples, the data may include image data of images (of the environment) obtained by stereo camera 160. In this regard, controller 145 may generate a disparity map based on the images (e.g., based on the image data of the images). The disparity map may include information indicating a difference (e.g., a pixel difference) between the images, an array of depth and/or 3D values (e.g., when controller 145 receives data from other sensor devices capable of capturing an array of depth measurements), among other examples of information that provides an indication of depth. Controller 145 may generate the disparity map using one or more data processing techniques (e.g., one or more data processing techniques for generating disparity maps).

Controller 145 may determine, based on the image data of the disparity map, depth information indicating distances from machine 105 to different areas of the ground surface. For example, based on the image data of the disparity map, controller 145 may determine the distances from a front portion of machine 105 to the different areas of the ground surface.

In some examples, controller 145 may perform image processing (e.g., using one or more image processing techniques) on the image data of the disparity map. For example, controller 145 may interpolate data in one or more portions of the disparity map. Additionally, or alternatively, controller 145 may perform filtering on the image data (e.g., perform the filtering on the disparity map) to reduce an amount of noise (e.g., outlier data) in the disparity map and to enhance a resolution of the disparity map (e.g., enhance a measure of smoothness of the disparity map). By reducing the amount of noise and enhancing the resolution of the disparity map, controller 145 may improve an amount of useful information provided to remote control device 170 to facilitate the remote control operation of machine 105. Controller 145 may perform filtering using one or more image filtering techniques such as spatial noise reduction filtering, temporal/time filtering, among other examples.

Controller 145 may generate the overlays based on the depth information. In some implementations, controller 145 may generate the overlays based on the depth information and based on range information identifying a plurality of ranges of distances from machine 105. The plurality of ranges of distances may include a first range of distances from machine 105, a second range of distances from machine 105, and so on. In some implementations, a distance between a highest value and a lowest value, of two or more of the plurality of ranges of distances, may be the same. Controller 145 may be preconfigured with the range information (e.g., the range information may be stored in one or more memories 220), may receive the range information from an input component of the controller associated device, may receive the range information from remote control device 170, and/or may receive the range information from an input component of machine 105.

As part of generating the overlays, controller 145 may identify different portions of the disparity map (e.g., different areas of the ground surface) associated with the plurality of ranges based on the depth information. For example, controller 145 may identify a first area (of the ground surface) associated with the first range of distances based on the depth information. For instance, controller 145 may determine a distance from machine 105 to the first area based on the depth information and determine that the distance (from machine 105 to the first area) corresponds to (or is included in) the first range of distances.

In some examples, controller 145 may determine the distance from machine 105 to the first area (or to a point in the first area) based on a mathematical combination of a lens distance between a first lens and a second lens of stereo camera 160, a focal length of stereo camera 160, and a disparity value of pixels depicting the first area (e.g., a disparity of pixels between a first image of the first lens and a second image of the second lens). For example, controller 145 may determine the distance from machine 105 to the first area as:

$$D=l*f/d$$

where D is the distance from machine 105 to the first area, l is the lens distance, f is the focal length, and d is the disparity value.

The above formula is merely provided as an example. Other examples may be used to determine distances such as projective geometry, disparity and/or depth that be used to determine horizontal and vertical distances relative to stereo camera 160 and machine 105. Controller 145 may obtain information identifying the lens distance and the focal length from the input component of the controller associated device, from remote control device 170, and/or from the input component of machine 105. Controller 145 may determine the disparity value by analyzing (e.g., using one or more computer vision techniques) the first image of the first lens and the second image of the second lens to determine a difference between pixels in the first image and corresponding pixels in the second image. For example, controller 145 may determine the disparity value by determining (based on analyzing the first image and the second image) a shift (between the first image and the second image) of the first area depicted by pixels of the first image and corresponding pixels of the second image.

For example, assume that the first lens is a left lens and the second lens is a right lens. Controller 145 may determine a shift of the first area to the left in the second image and/or determine a shift of the first area to the right in the first image. In some instances, controller 145 may identify the pixels in the first image and the corresponding pixels in the second image using one or more stereo matching algorithms. Controller 145 may identify a second area of the ground surface associated with the second range of distances based on the depth information in a similar manner.

Controller 145 may generate the overlays to indicate the plurality of ranges of distances on the disparity map. For example, controller 145 may generate a first overlay in the first area to indicate the first range of distances, generate a second overlay in the second area to indicate the second range of distances, and so on. The overlays may include semitransparent bands that are horizontal with respect to a traveling direction of machine 105. The overlays may appear to lay over the ground surface at the different areas associated with the plurality of ranges of distances. When generating the overlays, controller 145 may modify portions of the disparity map (e.g., portions of the image data of the disparity map) corresponding to the plurality of ranges of distances. For example, controller 145 may generate the overlays by modifying pixels, of the image data, corresponding to the different areas associated with the plurality of ranges of distances.

For instance, controller 145 may modify the pixels by causing a shade of a color of the pixels to be lightened, modify the pixels by changing the color of the pixels to a particular color, modify the pixels to generate a graphical pattern, and/or may modify the pixels to generate a graphical design. In some examples, the overlays may indicate the plurality ranges of distances using same graphical information (e.g., a same shade, a same color, a same graphical pattern, and a same graphical design). Alternatively, the overlays may indicate the plurality ranges of distances using different graphical information. For example, the first overlay may indicate the first range of distances using first graphical information, the second overlay may indicate the second range of distances using second graphical information, and so on.

Controller 145 may determine the graphical information associated with the overlays. In some instances, controller 145 may be preconfigured with information identifying graphical information associated with the overlays. Alternatively, controller 145 may receive the graphical information from the input component of the controller associated device, from remote control device 170, and/or from the input component of machine 105.

Controller 145 may generate outlines, for the overlays, that visually distinguish the overlays from the ground surface. For example, controller 145 may generate an outline, for the first overlay, that visually distinguishes the first overlay from the ground surface, generate an outline, for the second overlay, that visually distinguishes the second overlay from the ground surface, and so on. Controller 145 may generate the outlines by modifying pixels that form the outlines. For instance, controller 145 may cause a color of the pixels to be darkened, cause a shade of the pixels to be darkened, among other examples. These outlines might also improve general viewability and ease of use regarding the final style of the overlays.

The first overlay and the outline for the first overlay may match a topography of the first area of the ground surface (e.g., a contour of the first area of the ground surface), the second overlay and the outline for the second overlay may match a topography of the second area of the ground surface (e.g., a contour of the second area of the ground surface), and so on. In some instances, controller 145 may generate the outlines using one or more object contour recognition algorithms. As an example, controller 145 may analyze the disparity map to identify edges of the first area (e.g., edges of items or objects forming a boundary of the first area) in the first image and in the disparity map. Controller 145 may identify pixels in the first image for which corresponding pixels are identified in the disparity map. Controller 145 may identify pixels (e.g., of the pixels in the first image) that form ends of an edge and may cause the ends to be connected (e.g., by adding pixels if the ends are not connected). The edges may form the outlines.

The overlays may provide an indication of a topography of the different areas of the ground surface. By providing the indication of the topography, the overlays may provide a good understanding of a topography of the ground surface and, therefore, facilitate an operation of machine 105 on the ground surface (e.g., operating machine 105 to avoid holes and/or uneven surfaces of the ground surface; adjusting an operation of machine 105 in light of the holes and/or uneven surfaces; among other examples).

In some examples, controller 145 may cause the overlays to be separated by a same distance based on distance information identifying a distance between the overlays. Controller 145 may be preconfigured with the distance information and/or may receive the distance information from the input component of the controller associated device, from remote control device 170, and/or from the input component of machine 105.

In some implementations, controller 145 may perform additional image processing on the image data of the disparity map after generating the overlays. For example, controller 145 may perform filtering on the image data to ensure that a width of an overlay satisfies a width threshold. For example, controller 145 may determine whether a width of a particular overlay satisfies the width threshold and remove the particular overlay when the width does not satisfy the width threshold. Controller 145 may be preconfigured with the width threshold and/or may receive the width threshold from the input component of the controller associated device, from remote control device 170, and/or from the input component of machine 105.

Additionally, or alternatively, to performing the filtering, controller 145 may determine a measure of confidence associated with the depth information of one or more portions of the overlays and adjust a measure of transparency of the one or more portions based on the measure of confidence. For example, controller 145 may determine whether a measure of confidence (associated with the depth information of a portion of an overlay) satisfies a confidence threshold and may modify a measure of transparency of the portion of the overlay when the measure of confidence does not satisfy the confidence threshold. Controller 145 may be preconfigured with the confidence threshold and/or may receive the confidence threshold from the input component of the controller associated device, from remote control device 170, and/or from the input component of machine 105.

As an example with respect to the measure of confidence, controller 145 may determine that a distance from machine 105 to an area (of the environment), corresponding to the portion, cannot be sufficiently determined. Controller 145 may determine that a measure of confidence (associated with the depth information of the portion) does not satisfy the confidence threshold. Accordingly, controller 145 may cause a portion of the image data, corresponding to the portion, to be nontransparent. In some implementations, the overlay may become increasingly transparent in portions where the measure of confidence is decreasing.

In some implementations, controller 145 may determine elevations associated with different portions of the different areas corresponding to the plurality of ranges. For instance, controller 145 may determine a first elevation of a first portion of the first area with respect to a plane associated with machine 105, determine a second elevation of a second portion of the first area with respect to the plane, and so on. The first portion may correspond to one or more first pixels, the second portion correspond to one or more second pixels, and so on. The plane may be a plane parallel to the ground surface. Controller 145 may determine the elevations on a pixel-by-pixel basis. In some examples, controller 145 may determine the first elevation of the first portion (of the first area) based on the depth information associated with the first portion in the disparity map and based on a height of stereo camera 160 with respect to the plane (e.g., an elevation of stereo camera 160 with respect to the plane) and/or an angle of stereo camera 160.

For instance, controller 145 may determine a distance from machine 105 to the first portion (e.g., based on a location of the first portion in the disparity map). Controller 145 may determine the height of stereo camera 160 based on camera height information identifying the height of stereo camera 160. Controller 145 may be preconfigured with the camera height information (e.g., the camera height information may be stored in one or more memories 220), may receive the camera height information from the input component of the controller associated device, may receive the camera height information from remote control device 170, and/or may receive the camera height information from the input component of machine 105. Controller 145 may determine the angle of stereo camera 160 based on camera angle information identifying the angle of stereo camera 160. Controller 145 may obtain the camera angle information in a manner similar to the manner described above with respect to the camera height information.

Controller 145 may use one or more image processing techniques to determine the first elevation (of the first portion with respect to the plane) based on a correlation between the distance (from machine 105 to the first portion) and the height of stereo camera 160 (e.g., the elevation of stereo camera 160 with respect to the plane) and/or the angle of stereo camera 160. In some instances, controller 145 may determine the first elevation based on a mathematical combination of the distance (from machine 105 to the first portion) and the height of stereo camera 160. Controller 145 may determine the second elevation of the second portion (of the first area), elevations of different portions of the second area, and so on, in a similar manner.

In some examples, controller 145 may use a digital elevation model to process the images in order to determine differences in the elevations associated with the different areas corresponding to the plurality of ranges. Additionally, or alternatively, controller 145 may use a digital surface model to process the images in order to determine differences in the elevations associated with the different areas.

Controller 145 may determine graphical information indicating the elevations associated with the different portions. For example, controller 145 may determine first graphical information indicating the first elevation of the first portion of the first area, second graphical information indicating the second elevation of the second portion of the first area, and so on. Controller 145 may determine elevations of different portions of the second area in a similar manner. Controller 145 may be preconfigured with the graphical information indicating the elevations. For example, one or more memories 220 may include a data structure that stores the first graphical information in association with information identifying the first elevation, stores the second graphical information in association with information identifying the second elevation, and so on.

The first graphical information may include one or more of a first color, a first graphical pattern, or a first graphical design. The second graphical information may include one or more of a second color, a second graphical pattern, or a second graphical design. In some examples, the second graphical information may be same as the first graphical information when the second elevation is same as the first elevation. Alternatively, the second graphical information may be different than the first graphical information when the second elevation is different than the first elevation. For example, the second color may be different than the first color, a second graphical pattern may be different than the first graphical pattern, or a second graphical design may be different than the first graphical design. The information identifying the first elevation may include a first range of elevations, a first grade of the ground surface, a first range of grades of the ground surface, among other examples. The information identifying the second elevation may include a second range of elevations, a second grade of the ground surface, a second range of grades of the ground surface, among other examples.

In addition, or in the alternative, to controller 145 being preconfigured with the graphical information indicating the elevations, controller 145 may receive the graphical information from the input component of the controller associated device, from remote control device 170, and/or from the input component of machine 105. Controller 145 may modify the portion of the image data associated with the elevations based on the graphical information indicating the elevations (stored in the data structure or received by controller 145). For example, controller 145 may modify the overlays (generated to indicate the plurality of ranges of distances on the disparity map) based on the graphical information. For instance, controller 145 may modify the one or more first pixels associated with the first portion to reflect the first graphical information, modify the one or more second pixels associated with the second portions to reflect the second graphical information, and so on. Controller 145 may modify pixels associated with different portions of the second area in a similar manner.

In some implementations, various aspects of the overlays (to be provided with the video feed) may be configured by controller 145 based on different factors. For example, a quantity of the overlays, a measure of transparency of the overlays, color information identifying a color of the overlays, and/or width information identifying a width of the overlays may be configured by controller 145 based on different factors.

As an example, controller 145 may determine a type of machine 105 based on type information identifying the type of machine 105. In some instances, controller 145 may receive the type information from the input component of the controller associated device, from remote control device 170, and/or from the input component of machine 105. Based on the type of machine 105, controller 145 may determine overlay information that includes information identifying ranges of distances (associated with the type of machine 105) to be indicated in the video feed, information identifying a quantity of overlays to be provided (with the video feed) for the type of machine 105, and/or information identifying visual characteristics of the overlays.

As an example, one or more memories 220 (of controller 145) may include a data structure that stores type information of different types of machines in association with corresponding overlay information (e.g., first type information in association with first overlay information, second type information in association with second overlay information, and so on). In this regard, controller 145 may perform a look-up of the data structure, using the type information (identifying the type of machine 105), to identify the overlay information associated with the type information. Controller 145 may generate the overlays based on the overlay information associated with the type of machine 105. For example, the overlays may indicate the ranges of distances identified by the overlay information, a quantity of the overlays (generated by controller 145) may correspond to the quantity of overlays identified by the overlay information, and visual characteristics of the overlays may correspond to the visual characteristics identified by the visual characteristics information.

In addition, or in the alternative, to determining the overlay information based on the type of machine 105, controller 145 may determine the overlay information based on a task associated with machine 105 (e.g., a task being performed or to be performed by machine 105). Controller 145 may determine the task associated with machine 105 based on task information identifying the task associated with machine 105 and may determine overlay information associated with the task using the task information in a manner similar to the manner described above. Controller 145 may generate the overlays based on the overlay information associated with the task associated machine 105 in a manner similar to the manner described above.

Continuing with respect to configuring the various aspects of the overlays, controller 145 may receive, from remote control device 170, visual characteristics information identifying a visual characteristic of an overlay. The visual characteristics information may include transparency information identifying a measure of transparency of the overlay, color information identifying a color of the overlay (and its accompanying border), width information identifying a width of the overlay, and/or spacing information identifying spacing between overlays. Based on the visual characteristics information, controller 145 may adjust the measure of transparency of the overlay, adjust the color of the overlay, adjust the border of the overlay, and/or adjust the width of the overlay.

Continuing with respect to configuring the various aspects of the overlays, controller 145 may receive, from remote control device 170, information identifying a quantity of overlays to be provided with the video feed. Controller 145 may generate the overlays based on the information identifying the quantity of overlays. For example, a quantity of the overlays generated by controller 145 may be based on the information identifying the quantity of overlays. Controller 145 may further receive, from remote control device 170, information identifying a particular distance (e.g., a furthest distance) from machine 105 for a particular overlay. Controller 145 may generate the particular overlay based on the information identifying the particular distance. For example, the particular overlay may be provided at a particular area, of the ground surface, corresponding to the particular distance.

Additionally, or alternatively, to generating the overlays that indicate ranges of distances and elevations, controller 145 may generate an overlay that indicates a distance, in a plane parallel to the ground surface, from machine 105 to machine work tool 140. In this regard, controller 145 may determine a first position of machine work tool 140 with respect to machine 105 (e.g., with respect to machine body 115). As an example, controller 145 may obtain the tool position data (e.g., from one or more IMUs 150) and may determine, based on the tool position data, coordinates of machine work tool 140 with respect to a coordinate system associated with machine 105 (e.g., coordinates with respect to a swing axis of machine 105). Controller 145 may determine the first position based on the coordinates of machine work tool 140.

As another example, controller 145 may obtain, from stereo camera 160, images that include machine work tool 140. Controller 145 may determine tool depth information for machine work tool 140 (e.g., depth of machine work tool 140 with respect to stereo camera 160) based on the images, in a manner similar to the manner described above. Stereo camera 160 may obtain location information identifying a location of stereo camera 160 on machine 105 (e.g., from the input component of the controller associated device, from remote control device 170, and/or from the input component of machine 105). Controller 145 may determine the first position of machine work tool 140 based on the tool depth information for machine work tool 140 and based on the location information. For example, controller 145 determine the first position based on a correlation between the depth of machine work tool 140 with respect to stereo camera 160 and the location of stereo camera 160 on machine 105).

Controller 145 may determine, based on the first position, an estimated first ground engagement location, on the ground surface, at which machine work tool 140 is to engage the ground surface when machine work tool 140 is lowered to the ground surface from its current above-the-ground position. For example, controller 145 may analyze the disparity map to determine a location on the ground surface (e.g., the estimated first ground engagement location) corresponding to the first position. For instance, controller 145 may determine a distance from machine 105 to the first position based on the coordinates of the swing axis and the coordinates of the first position (e.g., determine a difference between the longitudinal coordinate of the first position and the longitudinal coordinate of the swing axis). The distance from machine 105 to the first position may correspond to the distance (in the plane parallel to the ground surface) from machine 105 to machine work tool 140. Controller 145 may analyze the disparity map (e.g., using one or more computer vision techniques) to determine a point, on the ground surface, located at a distance from machine 105 that corresponds to the distance from machine 105 to the first position. Controller 145 may determine such point to be the estimated first ground engagement location.

Controller 145 may generate an overlay (as described above) based on a distance, on the ground surface, from machine 105 to the estimated first ground engagement location. The distance from machine 105 to the estimated first ground engagement location may correspond to the distance (in the plane parallel to the ground surface) from machine 105 to machine work tool 140. Accordingly, controller 145 may generate the overlay to indicate the distance, in the plane parallel to the ground surface, from machine 105 to machine work tool 140.

The overlay may include a graphical representation of machine work tool 140. For example, a shape of the overlay may correspond to a shape of machine work tool 140. For instance, the shape of the overlay may be a rectangular shape, a square shape, a trapezoidal shape, a shape that follows an outline of the shape of machine work tool 140, among other examples. A width of the graphical representation may be based on a width of machine work tool 140. The overlay may be a semitransparent band that is vertical with respect to a traveling direction of machine 105. In some instances, the overlay may simulate a shadow of machine work tool 140 (e.g., simulate a real shadow as if a light source was shining directly above machine work tool 140).

After generating the overlay, controller 145 may detect a movement of machine work tool 140 from the first position to a second position (e.g., as a result of boom 130 and/or stick 135 being extended or being retracted with respect to their current positions). For example, controller 145 may receive information indicating a movement of machine work tool 140 (e.g., from one or more IMUs 150, from remote control device 170, and/or from the controller associated device). Based on receiving the information indicating a movement of machine work tool 140, controller 145 may determine the second position of machine work tool 140 in a manner similar to the manner described above with respect to determining the first position. Controller 145 may determine, based on the second position, an estimated second ground engagement location, on the ground surface, at which machine work tool 140 is to engage the ground surface when machine work tool 140 is lowered to the ground surface from its current above-the-ground position (in a manner similar to the manner described above with respect to determining the estimated first ground engagement location). Controller 145 may adjust the overlay based on a distance from the work vehicle to the estimated second ground engagement location. The overlay, after being adjusted, may indicate a change in the distance from machine 105 to machine work tool 140 based on the movement of machine work tool 140. In some implementations, controller 145 may determine a height of machine work tool 140 (e.g., with respect to the plane associated with machine 105) based on data from one or more sensor devices of machine 105. For example, controller 145 may determine the height of machine work tool 140 based on the tool position data from one or more IMUs 150. Controller 145 may determine graphical information indicating the height of machine work tool 140 and modify the overlay based on the graphical information in a manner similar to the manner described above with respect to the graphical information of the different elevations.

Additionally, or alternatively, to generating the overlay that indicates the distance from machine 105 to machine work tool 140, controller 145 may generate an overlay that indicates a swing path of machine work tool 140 when machine body 115, of machine 105, rotates while machine work tool 140 is in a particular position (e.g., the first position, the second position, and so on). Controller 145 may determine the particular position of machine work tool 140 in a manner similar to the manner described above. Controller 145 may determine a distance, in the plane parallel to the ground surface, from machine 105 to machine work tool 140 (e.g., distance from the swing axis of machine 105) when machine work tool 140 is at the particular position, in a manner similar to the manner described above. Controller 145 may generate the overlay to indicate the swing path (e.g., in a camera view of stereo camera 160) associated with the distance from machine 105 to machine work tool 140 (e.g., associated with the distance from the swing axis). Controller 145 may adjust the swing path as machine work tool 140 moves to different positions.

Additionally, or alternatively, to generating the overlay that indicates the swing path of machine work tool 140, controller 145 may generate overlays to indicate different elevations when machine 105 is located on a sloped surface. For example, controller 145 may receive the machine position data from one or more IMUs 150 (e.g., located on machine body 115). Controller 145 may determine, based on the machine position data, that machine 105 is located on a sloped surface. Controller 145 may determine a horizontal plane relative to a direction of gravity, based on determining that machine 105 is located on the sloped surface. For example, controller 145 may determine the horizontal plane based on analyzing the disparity map and based the machine position data. The horizontal plane may be a reference plane. Controller 145 may further analyze the disparity map to identify a third area (of the ground surface) below the horizontal plane and a fourth area (of the ground surface) above the horizontal plane.

Controller 145 may determine an elevation of the third area with respect to the horizontal plane and an elevation of the fourth area with respect to the horizontal plane in a manner similar to the manner described above with respect to determining the different elevations. Controller 145 may determine graphical information for the areas in a manner similar to the manner described above. For instance, controller 145 may determine third graphical information indicating an elevation of the third area with respect to the horizontal plane, fourth graphical information indicating an elevation of the fourth area with respect to the horizontal plane, and fifth graphical information for a fifth area to indicate that the fifth area is on a plane associated with machine 105 (e.g., a plane on which machine 105 is located). Controller 145 may provide an overlay (with the third graphical information) to indicate the elevation of the third area with respect to the horizontal plane, another overlay (with the fourth graphical information) to indicate the elevation of the fourth area with respect to the horizontal plane, and so on. Controller 145 may perform similar actions when the reference plane is a plane parallel to the sloped surface.

Controller 145 may provide the overlays (described above) for display by a display of remote control device 170. For example, controller 145 may provide a video feed (in real time or near real time) of the environment based on data received from stereo camera 160. The video feed may include the image data (of the disparity map) with one or more of the overlays, as described below in connection with FIGS. 3-7. The overlays may be provided on the ground surface to facilitate an operation of machine 105 on the ground surface. For example, the overlays may facilitate a remote control operation of machine 105 on the ground surface.

In some instances, the video feed may include recommendations regarding an operation of machine 105 based on the overlays (e.g., a recommendation to move to a direction to avoid a possible obstacle, a recommendation to adjust an implement of machine 105, among other examples). In some examples, controller 145 may receive, from remote control device 170, display information indicating whether the overlays are to be provided for display with the video feed. Controller 145 may provide the overlays, for display with the video feed, when the display information indicates that the overlays are to be provided for display with the video feed. Controller 145 may remove one or more of the overlays from the video feed when the display information indicates that the one or more of the overlays are to be removed from the video feed.

For autonomous control of machine 105, controller 145 may use the depth information, information regarding the elevations, and/or the machine position data (e.g., indicating that machine 105 is located on a sloped surface) to generate signals and provide the signals to different components of machine 105 for the purpose of autonomously controlling an operation of machine 105 (e.g., controlling an operation of machine 105 independently of an operator). For example, based on the depth information, the information regarding the elevations, and/or the machine position data, controller 145 may generate signals to autonomously control a speed of machine 105, an acceleration of machine 105, a traveling direction of machine 105, a movement and/or a position of one or more implements of machine 105, among other examples.

The number and arrangement of devices shown in FIG. 2 are provided as an example. In practice, there may be additional devices, fewer devices, different devices, or differently arranged devices than those shown in FIG. 2.

Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
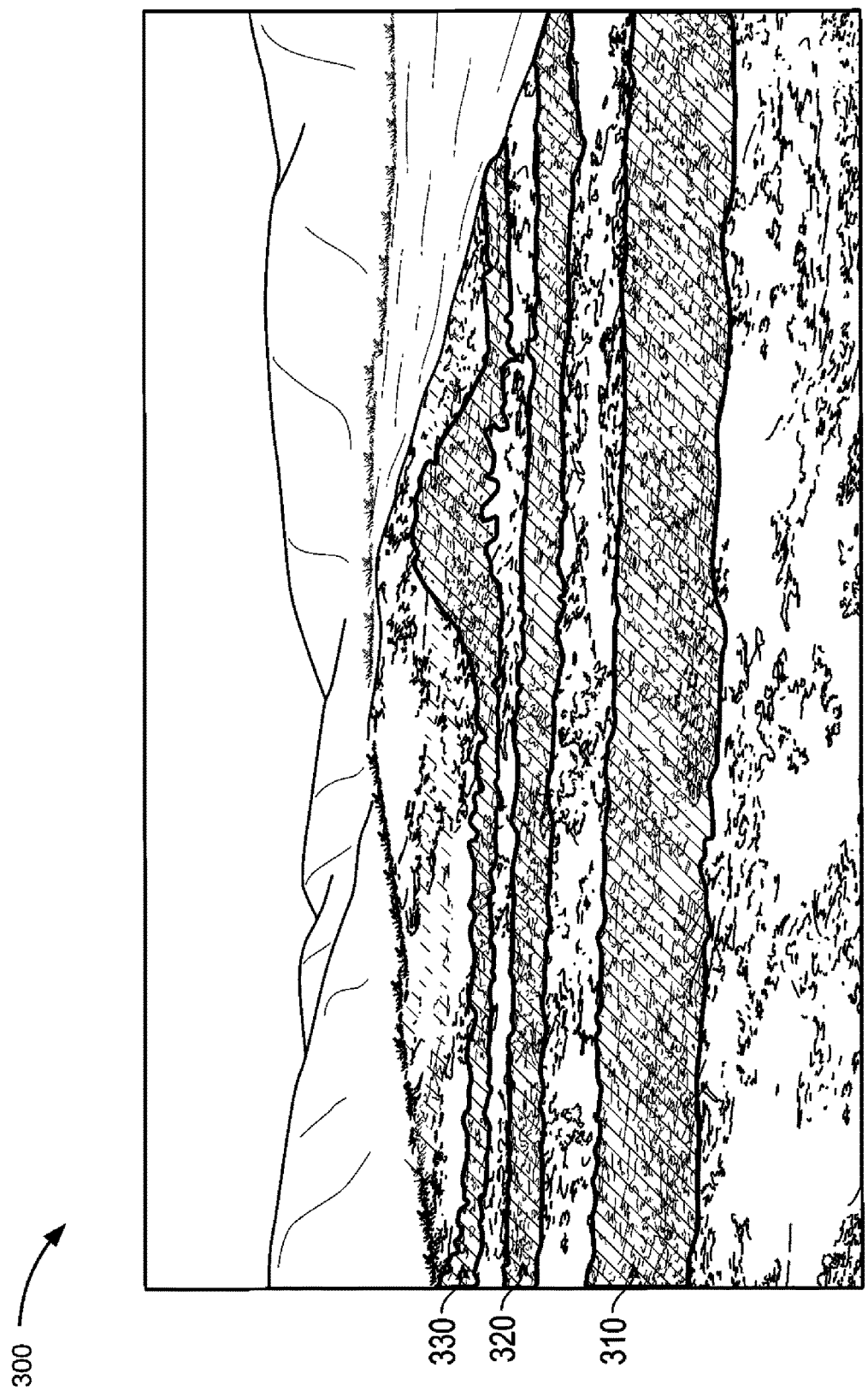
FIG. 3 is a diagram of an example implementation described herein.

FIG. 3 is a diagram of an example implementation 300 described herein. As shown in FIG. 3, example implementation 300 may include information provided on a display of remote control device 170. For example, the display of remote control device 170 may display a video feed, in real time or near real time, of an environment that includes a ground surface on which machine 105 is located. The video feed may be generated based on image data obtained by stereo camera 160. As shown in FIG. 3, the video feed includes overlay 310, overlay 320, and overlay 330 which appear to lay over the ground surface. Overlay 310, overlay 320, and overlay 330 may be generated in a manner similar to the manner described above with respect to generating overlays.

Overlay 310 may indicate a first range of distances from machine 105. Overlay 320 may indicate a second range of distances from machine 105. Overlay 330 may indicate a third range of distances from machine 105. A distance between overlay 310 and overlay 320 may be the same as a distance between overlay 320 and overlay 330. As shown in FIG. 3, a shape of overlay 310, overlay 320, and overlay 330 may indicate a topography of areas, of the ground surface, associated with overlay 310, overlay 320, and overlay 330. For example, as shown in FIG. 3, overlay 330 may indicate what appears to be a mound of dirt in an area, of the ground surface, associated with overlay 330.

As indicated above, FIG. 3 is provided as an example. Other examples may differ from what was described in connection with FIG. 3.

Figure 4:
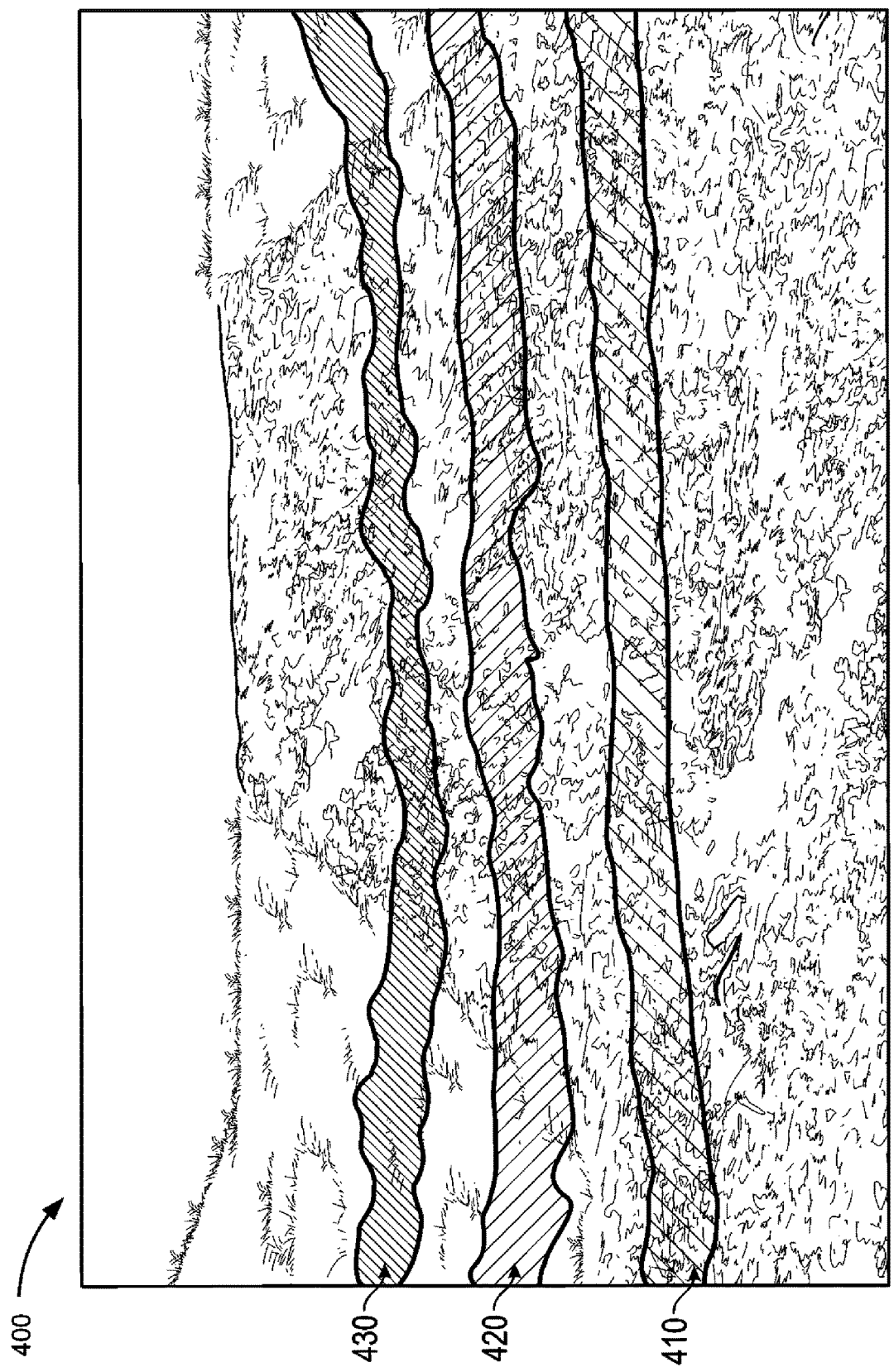
FIG. 4 is a diagram of an example implementation described herein.

FIG. 4 is a diagram of an example implementation 400 described herein. As shown in FIG. 4, example implementation 400 may include information provided on a display of remote control device 170, as described above in connection with FIG. 3. As shown in FIG. 4, the video feed includes overlay 410, overlay 420, and overlay 430 which appear to lay over the ground surface. Overlay 410, overlay 420, and overlay 430 may be generated in a manner similar to the manner described above with respect to generating overlays.

Overlay 410 may indicate a first elevation with respect to a plane associated with machine 105. Overlay 420 may indicate a second elevation with respect to the plane. Overlay 430 may indicate a third elevation with respect to the plane. As shown in FIG. 4, overlay 410 may be provided with first graphical information that indicates the first elevation, overlay 420 may be provided with second graphical information (different than the first graphical information) that indicates the second elevation, and overlay 430 may be provided with third graphical information (different than the first graphical information and the second graphical information) that indicates the third elevation. In other words, overlay 410, overlay 420, and overlay 430 may provide different visual characteristics to indicate the different elevations. A distance between overlay 410 and overlay 420 may be the same as a distance between overlay 420 and overlay 430.

As indicated above, FIG. 4 is provided as an example. Other examples may differ from what was described in connection with FIG. 4.

Figure 5:
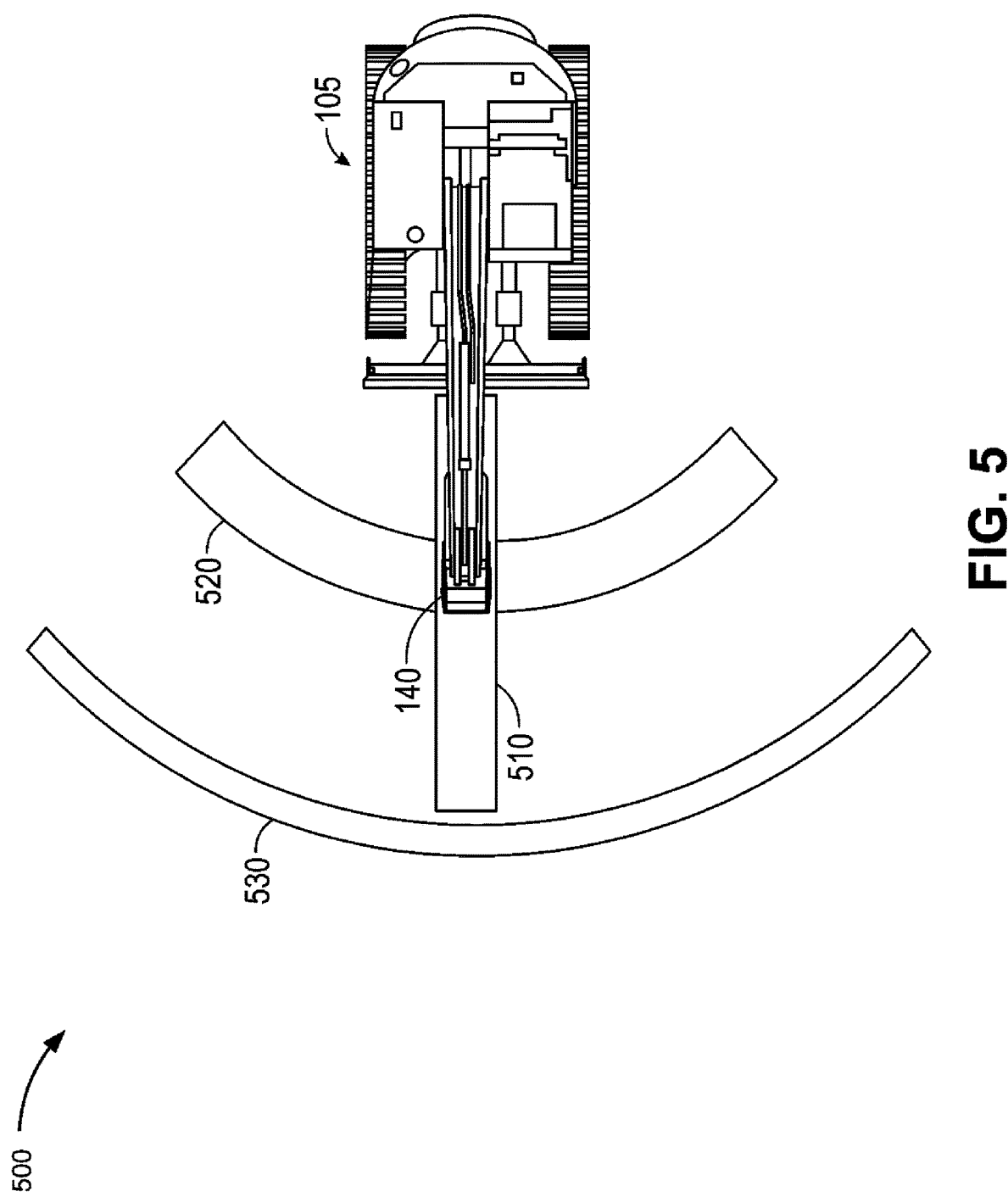
FIG. 5 is a diagram of an example implementation described herein.

FIG. 5 is a diagram of an example implementation 500 described herein. As shown in FIG. 5, example implementation 500 may include examples of overlays that may be provided on a display of remote control device 170. As shown in FIG. 5, the example overlays include overlay 510, overlay 520, and overlay 530. Overlay 510, overlay 520, and overlay 530 may lay over the ground surface, as explained above in connection with FIG. 3 and FIG. 4. Overlay 510, overlay 520, and overlay 530 may be generated in a manner similar to the manner described above with respect to generating overlays.

Overlay 510 may indicate a distance, in a plane parallel to the ground surface, from machine 105 to machine work tool 140. Overlay 510 may be dynamically adjusted based on a movement of machine work tool 140 to different positions (e.g., as a result of boom 130 and/or stick 135 being extended or being retracted with respect to their current positions).

Overlay 520 may indicate a swing path of machine work tool 140 when machine body 115, of machine 105, rotates while machine work tool 140 is in a particular position. Overlay 520 may be dynamically adjusted based on a movement of machine work tool 140 to different positions. Overlay 530 may indicate the swing path of machine work tool 140 when boom 130 and stick 135 are fully extended.

As indicated above, FIG. 5 is provided as an example. Other examples may differ from what was described in connection with FIG. 5.

Figure 6:
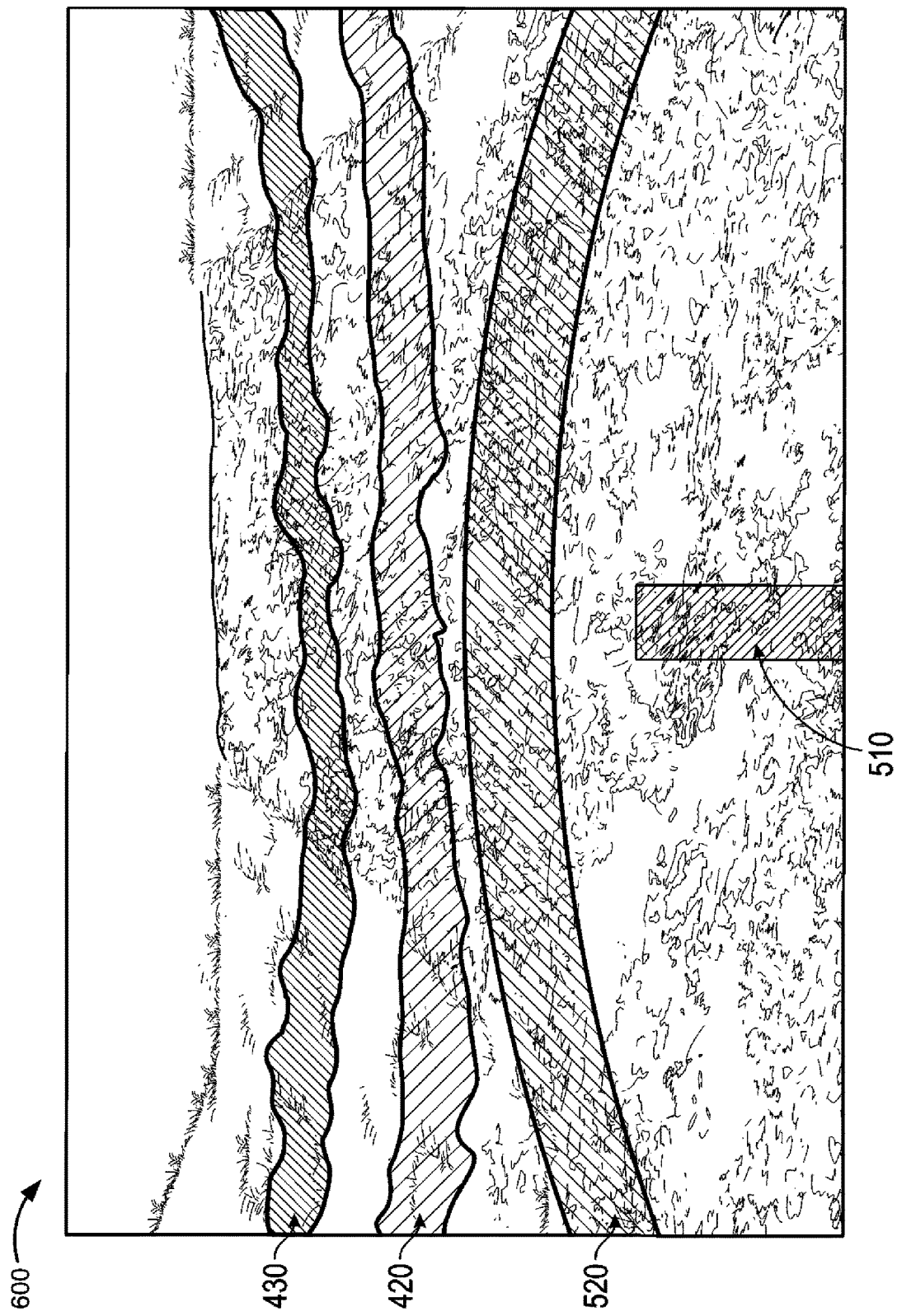
FIG. 6 is a diagram of an example implementation described herein.

FIG. 6 is a diagram of an example implementation 600 described herein. As shown in FIG. 6, example implementation 600 may include information provided on a display of remote control device 170, as described above in connection with FIG. 3. As shown in FIG. 6, the video feed includes overlay 420, overlay 430, overlay 510, and overlay 520 which appear to lay over the ground surface. Overlay 420, overlay 430, overlay 510, and overlay 520 have been described above in connection with FIG. 4 and FIG. 5.

As indicated above, FIG. 6 is provided as an example. Other examples may differ from what was described in connection with FIG. 6.

Figure 7:
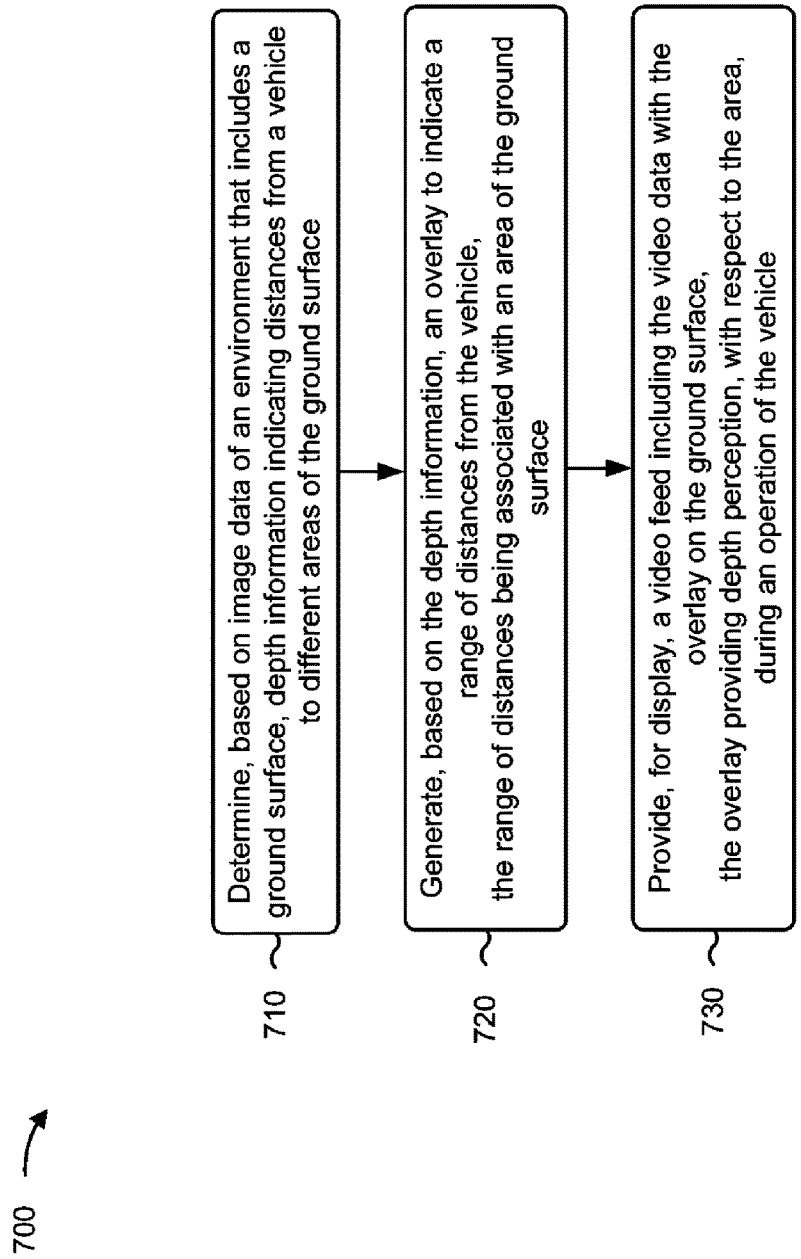
FIG. 7 is a flowchart of an example process relating to providing visual overlays for perception of depth.

FIG. 7 is a flowchart of an example process 700 relating to providing visual overlays for perception of depth. One or more process blocks of FIG. 7 may be performed by a device (e.g., controller 145). As explained above, the device may be located on machine 105, on remote control device 170, or separate from machine 105 and remote control device 170. One or more process blocks of FIG. 7 may be performed by another device or a group of devices separate from or including the device, such as a stereo camera (e.g., stereo camera 160), a remote control device (e.g., remote control device 170), and/or one or more IMUs (e.g., one or more IMUs 150).

As shown in FIG. 7, process 700 may include determining, based on image data of an environment that includes a ground surface, depth information indicating distances from a vehicle to different areas of the ground surface (block 710). For example, the device may determine, based on image data of an environment that includes a ground surface, depth information indicating distances from a vehicle to different areas of the ground surface, as described above.

As further shown in FIG. 7, process 700 may include generating, based on the depth information, a first overlay to indicate a first range of distances from the vehicle and a second overlay to indicate a second range of distances from the vehicle, the first range of distances being associated with a first area of the ground surface and the second range of distances being associated with a second area of the ground surface (block 720). For example, the device may generate, based on the depth information, a first overlay to indicate a first range of distances from the vehicle and a second overlay to indicate a second range of distances from the vehicle, the first range of distances being associated with a first area of the ground surface and the second range of distances being associated with a second area of the ground surface, as described above.

Generating the first overlay and the second overlay comprises generating a first semitransparent band with an outline that visually distinguishes the first semitransparent band from the ground surface in the video feed, and generating a second semitransparent band with an outline that visually distinguishes the second semitransparent band from the ground surface in the video feed.

Process 700 includes determining a task associated with the vehicle, determining, based on the task associated with the vehicle, overlay information that includes at least one of the first range of distances, the second range of distances, or a quantity of overlays to be provided with the video feed, and wherein generating the first overlay and the second overlay includes generating the first overlay and the second overlay based on the overlay information.

Process 700 includes determining a type associated with the vehicle, determining, based on the type associated with the vehicle, overlay information that includes at least one of the first range of distances, the second range of distances, or a quantity of overlays to be provided with the video feed, and wherein generating the first overlay and the second overlay includes generating the first overlay and the second overlay based on the overlay information.

Process 700 includes receiving, from the remote control device, information identifying a quantity of overlays to be provided with the video feed, wherein generating the first overlay and the second overlay comprises generating the first overlay and the second overlay based on the information identifying the quantity of overlays, and wherein providing the video feed comprises providing the first overlay and the second overlay for display with the video feed based on the information identifying the quantity of overlays.

As further shown in FIG. 7, process 700 may include providing, to a remote control device for display, a video feed including the image data with the first overlay and the second overlay on the ground surface, the first overlay and the second overlay providing a perception of depth, with respect to the first area and the second area, during a remote control operation of the vehicle using the remote control device (block 730). For example, the device may provide, to a remote control device for display, a video feed including the image data with the first overlay and the second overlay on the ground surface, the first overlay and the second overlay providing a perception of depth, with respect to the first area and the second area, during a remote control operation of the vehicle using the remote control device, as described above.

The first overlay includes a band provided, with the video feed, on the ground surface. The method further comprises receiving, from the remote control device, visual characteristics information identifying a visual characteristic of the band, the visual characteristics information including at least one of transparency information identifying a measure of transparency of the band, color information identifying a color of the band, or width information identifying a width of the band, and adjusting, based on the visual characteristics information, at least one of the measure of transparency of the band, the color of the band, or the width of the band, wherein the second overlay has a different visual characteristic than the first overlay.

Process 700 includes receiving, from the remote control device, display information indicating whether the first overlay and the second overlay are to be provided for display with the video feed, wherein providing the video feed for display comprises providing, for display with the video feed, the first overlay and the second overlay when the display information indicates that the first overlay and the second overlay are to be provided for display with the video feed, and wherein the method further comprises removing the first overlay and the second overlay from the video feed when the display information indicates that the first overlay and the second overlay are to be removed from the video feed.

Although FIG. 7 shows example blocks of process 700, process 700 may include additional blocks, fewer blocks, different blocks, or differently arranged blocks than those depicted in FIG. 7. Additionally, or alternatively, two or more of the blocks of process 700 may be performed in parallel.

Figure 8:
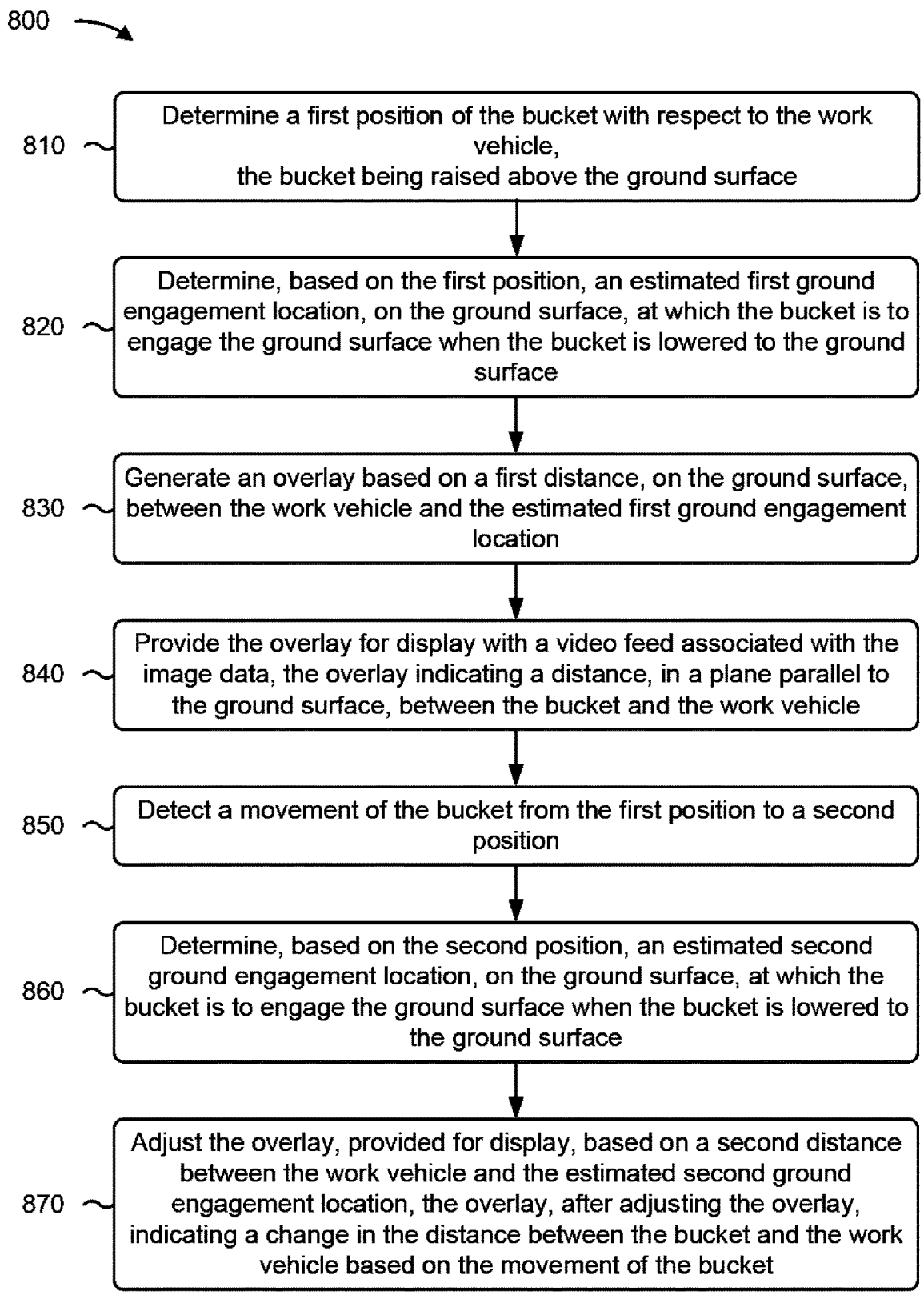
FIG. 8 is a flowchart of an example process relating to providing visual overlays for perception of depth.

FIG. 8 is a flowchart of an example process 800 relating to providing visual overlays for perception of depth. One or more process blocks of FIG. 8 may be performed by a controller (e.g., controller 145). As explained above, the controller may be located on machine 105, on remote control device 170, or separate from machine 105 and remote control device 170. One or more process blocks of FIG. 8 may be performed by another device or a group of devices separate from or including the controller, such as a stereo camera (e.g., stereo camera 160), a remote control device (e.g., remote control device 170), and/or one or more IMUs (e.g., one or more IMUs 150).

As shown in FIG. 8, process 800 may include determining a first position of the bucket with respect to the work vehicle, the bucket being raised above the ground surface (block 810). For example, the controller may determine a first position of the bucket with respect to the work vehicle, the bucket being raised above the ground surface, as described above.

As further shown in FIG. 8, process 800 may include determining, based on the first position, an estimated first ground engagement location, on the ground surface, at which the bucket is to engage the ground surface when the bucket is lowered to the ground surface (block 820). For example, the controller may determine, based on the first position, an estimated first ground engagement location, on the ground surface, at which the bucket is to engage the ground surface when the bucket is lowered to the ground surface from its current above-the-ground position, as described above.

As further shown in FIG. 8, process 800 may include generating an overlay based on a first distance, on the ground surface, from the work vehicle to the estimated first ground engagement location (block 830). For example, the controller may generate an overlay based on a first distance, on the ground surface, from the work vehicle to the estimated first ground engagement location, as described above.

As further shown in FIG. 8, process 800 may include providing the overlay for display with a video feed associated with the image data, the overlay indicating a distance, in a plane parallel to the ground surface, from the work vehicle to the bucket (block 840). For example, the controller may provide the overlay for display with a video feed associated with the image data, the overlay indicating a distance, in a plane parallel to the ground surface, from the work vehicle to the bucket, as described above.

The overlay may include a graphical representation of the bucket. The width of the graphical representation may be based on a width of the bucket.

As further shown in FIG. 8, process 800 may include detecting a movement of the bucket from the first position to a second position (block 850). For example, the controller may detect a movement of the bucket from the first position to a second position, as described above.

As further shown in FIG. 8, process 800 may include determining, based on the second position, an estimated second ground engagement location, on the ground surface, at which the bucket is to engage the ground surface when the bucket is lowered to the ground surface (block 860). For example, the controller may determine, based on the second position, an estimated second ground engagement location, on the ground surface, at which the bucket is to engage the ground surface when the bucket is lowered to the ground surface from its current above-the-ground position, as described above.

As further shown in FIG. 8, process 800 may include adjusting the overlay, provided for display, based on a second distance from the work vehicle to the estimated second ground engagement location, the overlay, after adjusting the overlay, indicating a change in the distance from the work vehicle to the bucket based on the movement of the bucket (block 970). For example, the controller may adjust the overlay, provided for display, based on a second distance from the work vehicle to the estimated second ground engagement location, the overlay, after adjusting the overlay, indicating a change in the distance from the work vehicle to the bucket based on the movement of the bucket, as described above.

The overlay may include a first overlay. The controller may be further configured to determine, based on the image data, depth information indicating distances from the work vehicle to different areas of the ground surface; generate, based on the depth information, a second overlay indicating a first range of distances from the work vehicle to a first area of the ground surface and a third overlay indicating a first range of distances from the work vehicle to a second area of the ground surface; and provide, for display with the video feed, the second overlay and the third overlay.

The overlay may be a first overlay. The controller may be further configured to generate a second overlay indicating a swing path of the bucket when a machine body, of the work vehicle, rotates while the bucket is in the first position, and provide, for display with the video feed, the second overlay with the first overlay, wherein the second overlay is provided, with the video feed, on the ground surface to indicate the swing path within a camera view of the stereo camera.

A width of the second overlay may be based on a size of the bucket.

Although FIG. 8 shows example blocks of process 800, process 800 may include additional blocks, fewer blocks, different blocks, or differently arranged blocks than those depicted in FIG. 8. Additionally, or alternatively, two or more of the blocks of process 800 may be performed in parallel.

INDUSTRIAL APPLICABILITY

The present disclosure is directed to overlays (e.g., bands) that are provided with a video feed of an environment that includes a ground surface on which a machine is located. The overlays may provide an indication of depth with respect to different areas of the ground surface and/or provide an indication of one or more other characteristics of the different areas of the ground surface, such as elevation.

The disclosed overlays may prevent issues associated with typical camera systems used during remote control operations without line-of-sight.

Such camera systems provide 2D images. The 2D images do not provide sufficient information to enable a remote control operator to gain a good understanding of a terrain surrounding the machine and do not provide information regarding depth associated with the terrain. Therefore, relying on typical camera systems to operate the machine (without line-of-sight with respect to the machine) may consume computing resources, network resources, and other resources associated with inefficient operation of the machine, associated with repairing the machine, associated with remedying a task that was performed incorrectly by the machine, among other examples.

The overlays, of the present disclosure, are provided with the video feed of the environment to enable the remote control operator to gain a good understanding of the terrain surrounding the machine and to provide information regarding depth associated with the terrain. By providing the overlays with the video feed, the present disclosure may enable efficient operation of the machine (e.g., by avoiding having to reperform a task that was performed incorrectly, by efficiently using components of the machine, among other examples), may prevent damage to the machine, may cause a task to be performed correctly by the machine, among other examples. Accordingly, by providing the overlays with the video feed, the present disclosure may preserve computing resources, network resources, and other resources that would have otherwise been consumed by operating the machine inefficiently, repairing the machine, remedying a task that was performed incorrectly by the machine, among other examples.

What is claimed is:

1. An excavator, comprising:
   a stereo camera that obtains three-dimensional image data of an environment that includes a ground surface on which the excavator is located;
   a bucket; and
   a controller configured to:
      determine, based on the three-dimensional image data, depth information indicating distances from the excavator to different areas of the ground surface;
      generate an overlay, based on the depth information, that corresponds to a swing path of the bucket, wherein a width of the overlay is based on a width of the bucket; and
      provide the overlay for display with a video feed associated with the image data, the overlay being provided to facilitate remote control of an operation of the excavator on the ground surface.

2. The excavator of claim 1, wherein the overlay is configured to indicate the swing path of the bucket when a machine body of the excavator rotates with the bucket in a particular position.

3. The excavator of claim 1, wherein the overlay is configured to be dynamically adjusted based on a movement of the bucket to different positions.

4. The excavator of claim 1, wherein the overlay is associated with a depth range that corresponds to the swing path of the bucket.

5. The excavator of claim 1, wherein the excavator further includes:
   a boom coupled to a machine body of the excavator; and
   a stick coupled to the boom and the bucket,
   wherein the overlay is a first overlay and the swing path is a first swing path, and wherein the controller is further configured to:
generate a second overlay that corresponds to a second swing path of the bucket when the boom and the stick are fully extended; and
provide, with the first overlay, the second overlay for display with the video feed associated with the image data, the first overlay and the second overlay being configured to provide a perception of depth.

6. The excavator of claim 1, wherein the overlay includes a single radial distance band.

7. The excavator of claim 1, wherein the overlay is generated based on a distance from a swing axis of the excavator to the bucket.

8. The excavator of claim 1, wherein the overlay is a first overlay, and wherein the controller is further configured to:
generate a second overlay that indicates a distance, in a plane parallel to the ground surface, from the excavator to the bucket; and
provide, with the first overlay, the second overlay for display with the video feed associated with the image data.

9. The excavator of claim 1, wherein the overlay is a first overlay, and wherein the controller is further configured to:
determine a first position of the bucket with respect to the excavator, the bucket being raised above the ground surface;
determine, based on the first position, an estimated first ground engagement location, on the ground surface, at which the bucket is to engage the ground surface when the bucket is lowered to the ground surface;
generate a second overlay that corresponds to the estimated first ground engagement location; and
provide, with the first overlay, the second overlay for display with the video feed associated with the image data.

10. An excavator, comprising:
a stereo camera that obtains three-dimensional image data of an environment that includes a ground surface on which the excavator is located;
a bucket; and
a controller configured to:
determine, based on the three-dimensional image data, depth information indicating distances from the excavator to different areas of the ground surface;
determine a first position of the bucket with respect to the excavator, the bucket being raised above the ground surface;
determine, based on the first position, an estimated first ground engagement location, on the ground surface, at which the bucket is to engage the ground surface when the bucket is lowered to the ground surface;
generate an overlay, based on the depth information, that corresponds to the estimated first ground engagement location, wherein a width of the overlay is based on a width of the bucket; and
provide the overlay for display with a video feed associated with the image data, the overlay being provided to facilitate remote control of an operation of the excavator on the ground surface.

11. The excavator of claim 10, wherein the overlay is provided on the ground surface and indicates a distance, in a plane parallel to the ground surface, from the excavator to the bucket.

12. The excavator of claim 10, wherein generating the overlay includes generating the overlay based on a first distance, on the ground surface, from the excavator to the estimated first ground engagement location.

13. The excavator of claim 12, wherein the controller is further configured to determine the first distance based on coordinates of a swing axis of the excavator and coordinates of the first position.

14. The excavator of claim 12, wherein the controller is further configured to:
detect a movement of the bucket from the first position to a second position;
determine, based on the second position, an estimated second ground engagement location, on the ground surface, at which the bucket is to engage the ground surface when the bucket is lowered to the ground surface; and
adjust the overlay, provided for display, based on a second distance from the work vehicle to the estimated second ground engagement location,
the overlay, after adjusting the overlay, indicating a change in distance, from the first distance to the second distance, from the excavator to the bucket based on the movement of the bucket.

15. The excavator of claim 10, wherein the overlay includes a shape that corresponds to a shape of the bucket.

16. The excavator of claim 10, wherein determining the estimated first ground engagement location includes determining the estimated first ground engagement location based on a disparity map.

17. A controller associated with an excavator that includes a bucket and a stereo camera that obtains three-dimensional image data of an environment that includes a ground surface on which the excavator is located, the controller being configured to:
determine, based on the three-dimensional image data, depth information indicating distances from the excavator to different areas of the ground surface;
generate an overlay, based on the depth information, that corresponds to a swing path of the bucket, wherein a width of the overlay is based on a width of the bucket; and
provide the overlay for display with a video feed associated with the image data, the overlay being provided to facilitate remote control of an operation of the excavator on the ground surface.

18. The excavator of claim 17, wherein the overlay is configured to indicate the swing path of the bucket when a machine body of the excavator rotates with the bucket in a particular position.

* * * * *